United States Patent
Zahn et al.

(10) Patent No.: US 10,661,494 B2
(45) Date of Patent: May 26, 2020

(54) METHOD AND DEVICE FOR PRODUCING A MULTIPACK AND MULTIPACK

(71) Applicants: KHS GmbH, Dortmund (DE); KHS Corpoplast GmBH, Hamburg (DE)

(72) Inventors: Volker Zahn, Volkmarsen (DE); Arne-Fritz Wiese, Ahrensburg (DE)

(73) Assignees: KHS GmbH, Dortmund (DE); KHS Corpoplast GmbH, Hamburg (DE)

( * ) Notice: Subject to any disclaimer, the term of this patent is extended or adjusted under 35 U.S.C. 154(b) by 69 days.

(21) Appl. No.: 16/305,262

(22) PCT Filed: Apr. 24, 2017

(86) PCT No.: PCT/EP2017/059678
§ 371 (c)(1),
(2) Date: Nov. 28, 2018

(87) PCT Pub. No.: WO2017/211499
PCT Pub. Date: Dec. 14, 2017

(65) Prior Publication Data
US 2019/0358886 A1    Nov. 28, 2019

(30) Foreign Application Priority Data

Jun. 8, 2016 (DE) .................. 10 2016 110 600

(51) Int. Cl.
| | |
|---|---|
| *B29C 49/06* | (2006.01) |
| *B65B 17/02* | (2006.01) |
| *B29C 49/64* | (2006.01) |
| *B29K 67/00* | (2006.01) |
| *B29L 31/00* | (2006.01) |
| *B65B 63/00* | (2006.01) |

(52) U.S. Cl.
CPC .............. *B29C 49/06* (2013.01); *B65B 17/02* (2013.01); *B29C 49/6445* (2013.01); *B29K 2067/003* (2013.01); *B29L 2031/7158* (2013.01); *B65B 63/005* (2013.01)

(58) Field of Classification Search
CPC ..... B29C 49/06; B29C 49/6446; B65B 17/02; B65B 63/005; B29K 2067/003; B29L 2031/7158
See application file for complete search history.

(56) References Cited

U.S. PATENT DOCUMENTS

| | | | |
|---|---|---|---|
| 7,550,105 B2 | 6/2009 | Scheid | |
| 8,196,372 B2 | 6/2012 | Perl et al. | |

FOREIGN PATENT DOCUMENTS

| | | |
|---|---|---|
| DE | 10 2008 041575 | 3/2010 |
| DE | 10 2011 119966 | 11/2012 |
| DE | 10 2013 105428 | 11/2014 |
| EP | 0 293 147 | 11/1988 |
| FR | 2 224 278 | 10/1974 |
| JP | H11-188 785 | 7/1999 |

*Primary Examiner* — Michael C Miggins
(74) *Attorney, Agent, or Firm* — Occhiuti & Rohlicek LLP

(57) ABSTRACT

A method for producing a multipack of containers includes heating a preform, cooling at least part of the preform, the at least part of the preform defining a cooled region, and producing a first container from the preform. The container has a reinforced wall portion formed from the cooled region. The method continues with applying adhesive to the reinforced wall portion, thereby forming an adhesive point and fixing a second container to the adhesive point.

17 Claims, 3 Drawing Sheets

METHOD AND DEVICE FOR PRODUCING A MULTIPACK AND MULTIPACK

RELATED APPLICATIONS

This is the national stage of international application PCT/EP2017/059678, filed on Apr. 24, 2017, which claims the benefit of the Jun. 8, 2016 priority date of DE 102016110600.3, the contents of which are herein incorporated by reference.

FIELD OF INVENTION

The invention relates to container packaging and in particular, to forming multipacks of containers.

BACKGROUND

It is known to adhesively join containers together to form clusters, or "multipacks." These containers are often plastic containers. To save on weight and materials, the plastic containers have thin walls.

To remove a container from such a multipack, one applies a force to overcome the adhesive force. As one removes a container from the multipack, the container walls also sustain forces. It is preferable that the container be capable of sustaining such forces to avoid rupture that would spill the container's contents.

SUMMARY

In one aspect, the invention features a method for producing an adhesively bonded multipack with low weight that also has the structural integrity needed to avoid being damaged when containers are separated from the pack, even when the container is filled with a liquid that contains carbonic acid.

A method for producing a multipack with at least two containers includes causing at least one container to have a reinforced wall portion. Among such methods is one that includes providing a preform for a container, heating the preform and a cooling a region of the preform and producing a first container from the preform. As a result of having had a region thereof cooled, first container comprises a reinforced wall section formed from the cooled region of the preform. The method continues with applying an adhesive to the reinforced wall portion and using the adhesive to secure a second container to the first container.

The method results in a simple way of forming a multipack in which most of the container has thin walls, thus promoting lightness and conserving material use. However, a small portion of the container is dedicated to a reinforced wall portion that can sustain the forces of separation. The reinforced wall portion also provides pressure relief for containers that have been filled with a liquid containing carbonic acid.

In another aspect, the invention features an apparatus for making multipacks. Such an apparatus includes a heater to heat preforms, a stretch blow molding machine to produce containers from heated preforms, an adhesive applicator to apply adhesive to containers, and a combiner to join containers into a multipack. The apparatus also includes a nozzle arrangement for blowing cooling gas, thus defining a cooling zone for cooling part of a heated preform.

The apparatus as recited herein makes it possible to use almost any preform to produce a container that is both light and that has the strength to accommodate the force that arises when separating the container from a multipack. By suitably arranging the cooling zones, it is possible to adjust the position of the reinforced wall portion and its thickness in a particularly simple manner.

In another aspect, the invention features a multipack that is produced according to the method described herein or using the apparatus described herein. The multipack includes at least two containers that are connected by an adhesive joint. One or more containers, and in some cases, all containers, have a container wall that has a reinforced wall portion. The adhesive joint is at this reinforced wall portion. The reinforced wall portion is formed from a cooled region of the preform. The cooled region is one that remains cooler than the rest of the preform during a heating process that the preform sustains on its way to becoming a bottle through the action of a stretch blow molder.

Multipacks as described herein offer numerous advantages over conventional multipacks.

First, the multipacks combine low weight and high structural stability, particular around the adhesive joint.

Furthermore, the containers produced from a preform with at least one cooled partial region are also more stable than containers with reinforced wall portions that are produced from a uniformly-heated preform having regions of different wall thickness. This is believed to be because, in a preform as described herein, the different temperatures of the different partial regions lead to a different material deformation during production, in particular by stretch blow molding. This results in the arrangement of plastic molecules in the reinforced wall differing from that in the remainder of the container.

As used herein, term "multipack" refers to any arrangement of at least two containers that have, preferably at least four, and for particular preference at least six containers, and in which the containers are secured in a predetermined spatial position in relation to one another. The containers can, in principle, be arranged directly next to one another, for example by an adhesive joint, but also by a further element.

Furthermore, a multipack can be formed by a material joining connection and/or by a non-positive fit connection, for example by binding around with a material, in particular, by welding into a film. The containers of the multipack are preferably arranged in non-nesting positions so that the containers of one row of the multipack are not arranged in a gap between containers of an adjoining row of the multipack.

As used herein, "containers" refers to bottles, cans, tubes, bags, in each case made of metal, glass, plastic, and/or of a material composite, such as polyethylene terephthalate bottles or a material composite of plastic, aluminum foil, and paper. In general, the term "container" includes a volume that extends essentially on all sides and that has at least one opening. Preferably, the containers is suitable for receiving and being filled by fluid or viscous products. Containers that have already been gathered together to form groups, or multipacks, are also included as containers in the meaning of the invention.

A container can have any of a variety of cross-sections, including oval, round, or polygonal cross-sections. Although containers can be of any shape, including bag-shaped, pyramidal, or cuboid, they are frequently cylindrical. An example of a container is a bottle, which starts from a cylindrical basic body and tapers towards an opening In some embodiments, a container has a reinforced wall portion. A reinforced wall portion is understood to be a part of the basic body of the container and is therefore neither a part of a resting contact surface nor arranged in the region of the opening of the container. In this situation, a reinforced wall portion can be an area completely surrounding the container or comprise only a part of the circumference of the container.

A "reinforced wall portion" is a region of the wall of the container that is thicker than other parts of the wall, and in particular, thicker than the wall that surrounds it. This means that a region in which the spatial derivative of wall thickness is particularly high surrounds the reinforced wall portion.

Ideally, at least one reinforced wall portion is arranged in that region of the container that has the greatest diameter or the greatest width. Preferably, a reinforced wall portion surrounds the container entirely at a constant height.

As used herein, "heating the preform" refers to a process in which the material of the preform is heated until it can be shaped, as a result of having achieved an appropriate viscosity, by blow molding or stretch blow molding. The process of heating the preform includes attempting to heat the entire preform. In a typical process, the temperature of the preform, except for that portion that is cooled, reaches up to a value that is between 90° C. and 120° C. In some embodiments, the process of heating the preform includes moving the preform through a heating device, such as an oven or an arrangement of infrared radiators. In other embodiments, the process relies on separate heating of each individual preform.

As used herein, "cooling" means actively lowering the temperature of the material that is to be cooled at a rate that is faster than what would normally occur without assistance at ambient temperature. In some embodiments, this includes bringing a region of the preform in contact with a cooling device or a cooling medium. In some embodiments, the cooling medium is a gas.

The cooling process includes forming spatially distinct cooling zones to which the region to be cooled can be brought. This is carried out by having a suitable arrangement of gas nozzles that direct a cooling medium towards the cooling zone. The region to be cooled is then passed through the cooling zone. This causes the region to be cooled to have a temperature that is distinctly cooler than that of the remainder of the preform.

Cooling the preform can be carried out by initially heating it and then cooling a particular region thereof. Alternatively, cooling the preform can be carried out by heating the preform and cooling a part of it at the same time. In either case, a heater heats the entire preform and a cooler forms a cooling zone such that a region of the preform in the cooling zone is either cooled or less intensely heated. Suitable heaters include an over or a heating segment formed by infrared radiators.

A preform that has at least one cooled region is one that has at least two regions at different temperatures. The cooled region is at a lower temperature than the remainder of the preform.

In some embodiments, the preform has several cooled regions. These can be at different temperatures or at the same temperature. However, the cooled regions will all have temperatures that are distinctly less than the temperature of the uncooled portion of the preform.

In a particular embodiment, the preform has two cooled regions that are separated from each other along the container's vertical axis with an uncooled portion of the container between them. In some of these embodiments, the two cooled regions are at the same temperature. In others, they are at different temperatures.

A cooled region of a preform cannot have the same temperature at all points thereof for the simple reason that heat flows across a temperature difference. Therefore, there is a continuous temperature gradient between the cooled region and the rest of the preform. As used herein, the temperature of the cooled region means the lowest temperature in the cooled region.

The production of the container refers to a process through which the preform becomes a container by blow molding, using for example a stretch blow-molding machine. Production can also be carried out using a form-fill machine.

As used herein, "adhesive" refers to any active agent, substance, material, or compound that is suitable for producing an adhesive joint between containers. These include, in particular, any active agent, substance, material, or compound that, when applied in a fluid or viscous state, forms an adhesive point.

The term "adhesive" also includes an active agent, material, or compound that forms an adhesive agent in response to application of energy, such as by the application of pressure, radiation, or temperature, or by means of chemical hardening or cross-linking. Examples of such an adhesive include a ultraviolet-hardening adhesive, which can be processed even in the low-viscous state and can be hardened by radiation, a hot glue, which cools after application, and which, below a temperature typical of the material, loses its adhesive strength such that the hot glue is only suitable for the immediate and direct production of an adhesive point between two containers.

Also included within the term "adhesive" are multi-layered articles in which adhesive coats a carrier such that the article creates an adhesive point. A typical article of this type is a pad with adhesive on both sides.

In some embodiments, an adhesive is selected to have an adhesive strength that is low enough to permit a consumer of average strength to remove the container from the multipack by hand. An ultraviolet-hardening adhesive is particular suitable since its strength is easily adjusted by varying the adhesive's composition and the hardening procedure.

Among the embodiments are those in which nozzles apply the adhesive. Among these are embodiments in which the adhesive is a liquid that can be sprayed through the nozzles directly onto a container to form an adhesive point.

The pattern of adhesive can be varied. In some embodiments, the adhesive takes the form of a point. In others, it takes the form of a line. In yet others, it takes the form of a pattern of adhesive points. In still others, it takes the form of a pattern of adhesive lines.

In some practices, the process of combining the containers to fix them together to form a multipack includes pressing containers together such that the adhesive point forms a joint that connects the containers. In some practices, the adhesive joins containers directly to each other. In others, the adhesive points represent the exclusive or sole connection of the containers of a multipack. Among these practices are those that include hardening or cross-linking to form an adhesive point.

Other practices include aligning the container's reinforced wall portion using a device that also applies adhesive and doing so in such a way that the adhesive point is on the reinforced wall portion. Suitable ways to align the containers include rotating the containers using sensors that can detect variations the thickness of the container wall.

Some practices include applying the adhesive over the container's entire circumference. Among these are practices that include applying the adhesive at a constant height. These practices include applying adhesive as a continuous strand or as a row of adhesive points. With suitable control, it is possible to avoid having to align the adhesive points.

In some practices, a cooling gas flow cools a portion of the preform so as to lower the temperature on part of the preform. This results in a simply way to cool without risking the deformation that may arise upon direct contact with a cooling device. Although the composition of the gas is not important, suitable gases in include nitrogen, air, or a sterile gas to promote hygiene. A particularly useful gas is compressed air that is drawn from the environment rather than being cooled separately. It is also particularly useful to use a gas such as air to which additional water vapor has been added.

Some practices include rotating the preform during the cooling process so as to form a ring-shaped cooled region in a simple manner. Such a ring-shaped cooled region can be formed by directing cooling gas at a constant height on the preform while rotating the preform. The result is a reinforced wall portion that surrounds the entire circumference. This is particularly useful for simplifying the alignment process. The axis of rotation is preferably coincident with the container's axis.

Among these practices are those that include guiding the preform along a gas nozzle arrangement while rotating the preform. In some of these practices, the gas nozzle arrangement includes a slot nozzle. Preferably, the gas nozzle arrangement is at right angles to the preform's movement direction. This cools the preform at a consistent region as it runs past the gas nozzle arrangement.

Other practices feature stationary cooling of the cooled region for a specific period of time.

In some practices, the gas nozzle arrangement includes nozzles arranged along a line. Also among the practices are those that use only one gas nozzle arrangement. In these practices, it is preferable for the gas nozzle arrangement to face the part of the preform that is to be cooled. It is also useful in some practices to direct more than one gas nozzle arrangement onto the preform, for example from opposite sides thereof. In yet other practices, two gas nozzle arrangements form a single cooling zone.

Some practices include causing the cooled region to be about one degree centigrade cooler than the surrounding regions of the preform. Some practices include causing the cooled region to be about two degrees centigrade cooler than the surrounding regions of the preform. Some practices include causing the cooled region to be about five degrees centigrade cooler than the surrounding regions of the preform.

In other practices, the temperature difference between the cooled region and the result of the preform is between one degree centigrade and twenty degrees centigrade. In other practices, the temperature difference between the cooled region and the result of the preform is between two degrees centigrade and ten degrees centigrade. In other practices, the temperature difference between the cooled region and the result of the preform is between three degrees centigrade and eight degrees centigrade.

Practices include regulating the material thickness of the container's reinforced wall portion relative to the remainder of the container by regulating the cooling gas flow, the cooling gas pressure, or the rate of flow of cooling gas. This provides a simple way to adjust the temperature and hence the material properties of the cooled region.

To control the extent to which the reinforced wall portion is thicker than the remainder of the container, it is possible to adjust the duration of the cooling gas flow or the pressure of the cooling gas or both.

In some embodiments, one or both of these parameters are selected such that the thickness of the reinforced wall portion is 30% greater than that of the rest of the container wall. In other embodiments, one or both of these parameters are selected such that the thickness of the reinforced wall portion is 50% greater than that of the rest of the container wall. In yet other embodiments, one or both of these parameters are selected such that the thickness of the reinforced wall portion is 100% greater than that of the rest of the container wall. In other embodiments, one or both of these parameters are selected such that the thickness of the reinforced wall portion is between 130% greater and 300% greater than that of the rest of the container wall. In yet other embodiments, one or both of these parameters are selected such that the thickness of the reinforced wall portion is between 150% greater and 250% greater than that of the rest of the container wall. In still other embodiments, one or both of these parameters are selected such that the thickness of the reinforced wall portion is between 150% greater and 200% greater than that of the rest of the container wall.

The thickness of the reinforced wall portion depends on a variety of factors including the container's size and shape and the thickness of the remainder of the container's wall. As the container wall grows thicker, the thickness required at the reinforced wall region diminishes. In some embodiments, the container wall is between 0.1 millimeters and 0.2 millimeters, with 0.15 millimeters being particularly common. In such cases, the thickness of the reinforced wall portion is typically between 0.225 millimeters up to a maximum of about 0.3 millimeters.

A variety of preforms can be used with no particular limitation as to shape. In some embodiments, the preform is a thermoplastic material. Among these are preforms made of polyethylene terephthalate and preforms made of polypropylene.

In many embodiments, that portion of the preform that will ultimately form the container's wall has a constant thickness. This region that ultimately forms the container's wall differs from the regions that form the base and the neck near the container's opening.

In other embodiments, the preform is formed as one piece.

In yet other embodiments, the preform's thickness is uniform except near or at a prefabricated thread region.

In some embodiments, the second container also has at least one reinforced wall portion. In such embodiments, the adhesive joint forms between reinforced wall portions of adjacent containers. This is particularly useful because the force used to separate the container from the multipack affects both the container being separated and the container that it is being separated from.

In some embodiments of a multipack, all the containers of the multipack are identically formed. All containers thus have the same type of reinforced wall portion. Among these are embodiments in which each container has two reinforced wall portions. Among these are embodiments in which there exists one adhesive joint per reinforced wall portion. As a result, adjacent containers join each other at as many adhesive points as there are reinforced wall portions.

In some embodiments, the nozzle arrangement features a nozzle whose opening is shaped like a slot. Among these are embodiments in which the slot extends along the preform's direction of movement. In such embodiments, the slot's length is an integer multiple of the preform's circumference.

In other embodiments, the slot is arranged at right angles to the preform's direction of movement.

In another embodiment, there exist nozzle arrangements on both sides of the preform. In such embodiments, the length of the gas nozzle arrangement is an integer multiple of half of the preform's circumference.

In some embodiments, the nozzle arrangement comprises individual nozzles arranged in a line. Among these are embodiments in which there are three nozzles arranged in a line. Also among these are embodiments in which five nozzles are arranged in a line. For particularly large preforms, there exist embodiments in which ten nozzles are arranged in a line. In typical embodiments, each nozzle has only one opening.

Each nozzle as a spatial extent that is roughly equal in all directions. A suitable shape for a nozzle is a circle. Thus, in such embodiments, the nozzle is a borehole with a suitable diameter. In particular embodiments, the diameter is between half a millimeter and four millimeters. Among these are embodiments in which the nozzle is a borehole having a diameter between one millimeter and two millimeters.

Among the embodiments that use individual nozzles are those in which the nozzles are arranged on a carrier body. The carrier body's interior conveys cooling gas to the nozzles.

If one defines a cylindrical coordinate system whose axis coincides with the container's axis, the extent of the reinforced wall portion along the z-axis defines a "height." In some embodiments, this height is at least 3% greater than the diameter of the adhesive joint. In other embodiments, this height is at least 5% greater than the diameter of the adhesive joint. In yet other embodiments, this height is at least 10% greater than the diameter of the adhesive joint.

The wall of the container inherently has a surface area. The reinforced wall portion also has an surface area. The reinforced wall portion's surface area, when divided by the container's surface area, defines an area ratio. In some embodiments, the area ratio is 50%. In other embodiments, the area ratio is 25%. In yet other embodiments, the area ratio is 10%.

Between the reinforced wall portion and the remainder of the container wall there exists a tapering transition region. This tapering transition region defines a profile that can be seen in a cross section of the container. In some embodiments, the profile is that of a flat sinus or a sigmoidal curve.

Such a profile is believed to be achieved as a result of a temperature gradient that exists between the cooled portion of the preform and the remainder of the preform. This temperature gradient is believed to lead to an increase in material thickness in the cooled portion of the preform.

In a preferred embodiment, the reinforced wall portion is formed in a region of the container's unwinding ring.

A number of exemplary embodiments of the device according to the invention and of the method according to the invention are explained in greater detail hereinafter, by reference to the figures. The figures show:

DETAILED DESCRIPTION

Figure 1:
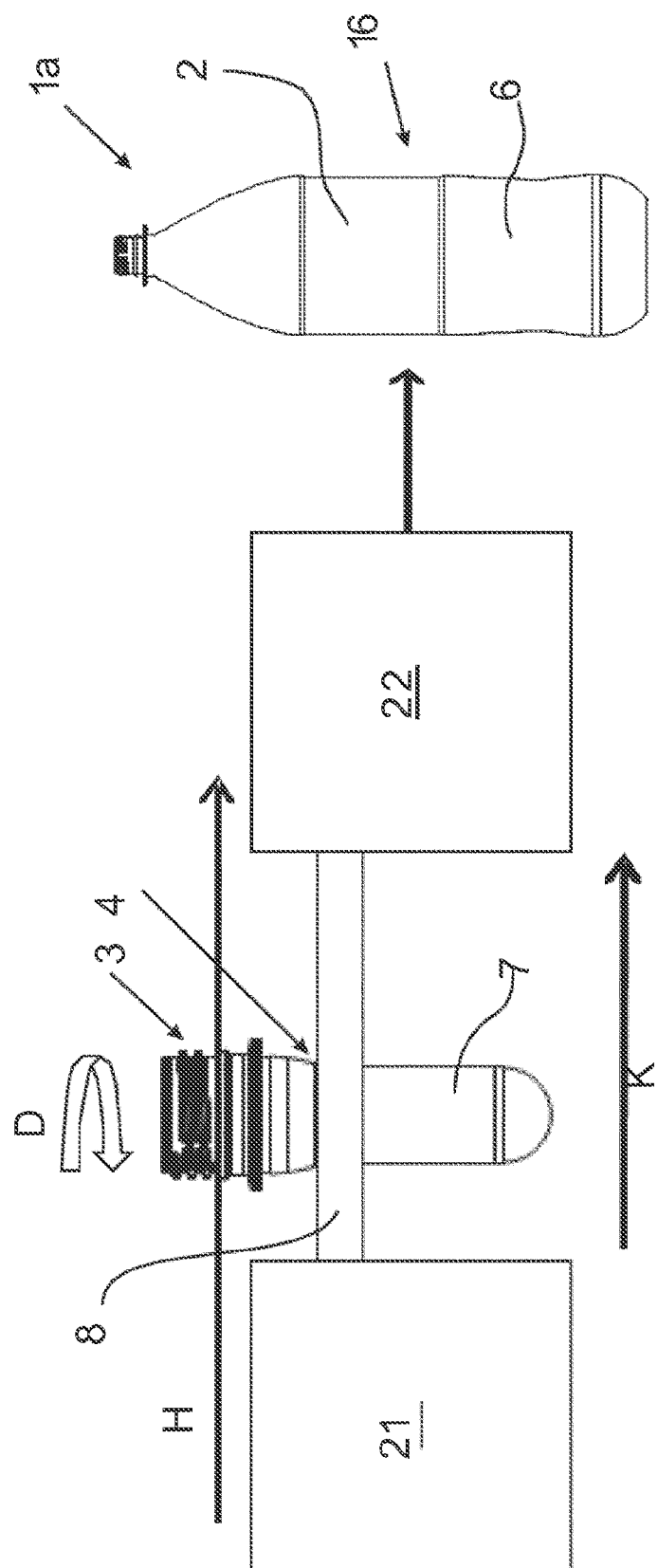
FIG. 1 shows a container with a reinforced wall section being produced from a preform.

FIG. 1 shows a preform 3 being heated by an oven 21 as it makes its way to a blow molder 2. During the heating process H, the preform rotates in a rotation direction D. FIG. 1 also shows a first bottle 1a that the blow molder 22 makes from the preform 3. The preform 3, and hence the resulting bottle 1a, is made of polyethylene terephthalate.

A nozzle arrangement within the oven 21 includes one or more nozzles to provide a cooling gas flow. In a typical embodiment, a four-edged tube having a row of boreholes forms the nozzle arrangement. Each borehole has about a one-millimeter diameter. A suitable cooling gas is compressed air with high relative humidity.

The cooling gas flow causes a cooling process K that forms a cooling zone 8 that a portion of the preform 3 passes through during the heating process H. This cooling zone 8 is clearly defined in relation to the preform's direction of movement.

The flow of cooling gas within the cooling zone 8 is regulated such that the portion of the preform 3 that passes through the cooling zone 8 becomes a distinct cooled region 4. This cooled region 4 ultimately becomes part of a container wall of a bottle 1a. In a preferred practice, the temperature of the cooled region 4 is about five degrees centigrade below that of the remainder of the preform 3.

Upon completion of the heating process H and the cooling process K, the blow molder 22 receives the preform 3 and forms a first bottle 1a from it. This first bottle 1a has a container wall 16. The material from the cooled region 4 forms a portion of the container wall 16. This portion is what becomes a reinforced wall portion 2 of the container wall 16.

The reinforced wall portion 2 is between 0.255 millimeters and 0.3 millimeters thick. The rest of the container wall 16 is about 0.15 millimeters thick. A transition region between the reinforced wall portion 2 and the rest of the container wall 16 takes the form of a sigmoidal curve, the precise shape of which depends on the temperature gradient between the cooled region 4 and the remainder of the preform 3.

Figure 2:
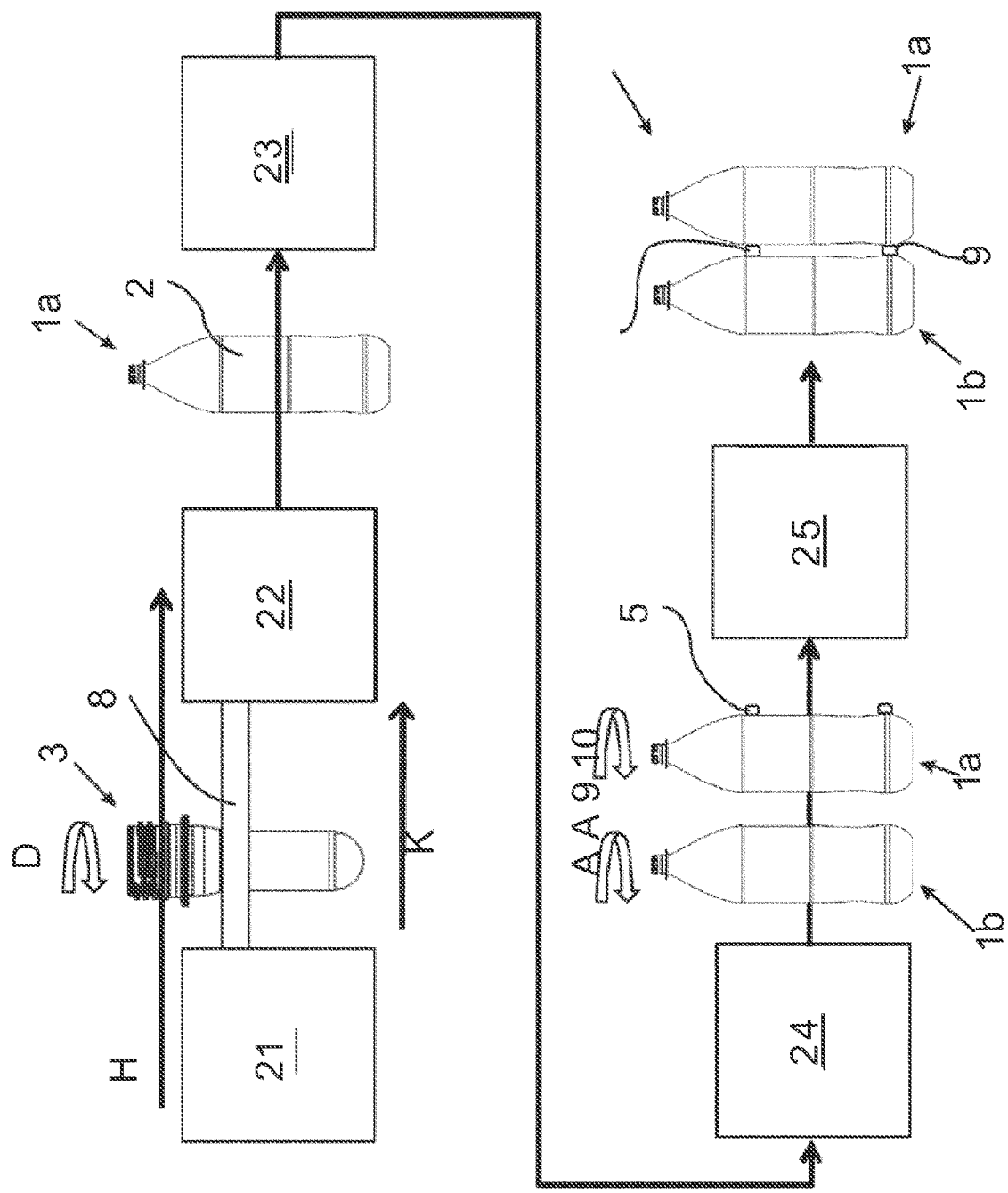
FIG. 2 shows the container from FIG. 1 becoming part of a multipack.

FIG. 2 shows the first bottle 1a together with a second bottle 1b being passed through a treatment unit 23 that fills, closes, and labels the bottles. In some embodiments, the treatment unit 23 fills the containers with a liquid that contains carbonic acid. The bottles 1a, 1b then joined to form a multipack 10.

Some of the bottles 1a go to an adhesive applicator 24. The adhesive applicator 24 places a fluid adhesive on the bottle 1a to form an adhesive point 5 thereon. More specifically, the adhesive applicator 24 places the adhesive on the reinforced portion 2 of the bottle's container wall 16. The bottles 1a, 1b then undergo an alignment process A during which they are oriented in the correct positions to be joined into a multipack 10.

After having been correctly oriented, the bottles 1a, 1b enter a combiner 25. The combiner 25 presses the containers 1a, 1b together to form an adhesive bond between them at the adhesive point 5. The combiner 25 maintains this pressure until the adhesive cools or hardens. In some cases, the combiner 25 adhesively bonds a carrying handle.

Figure 3:
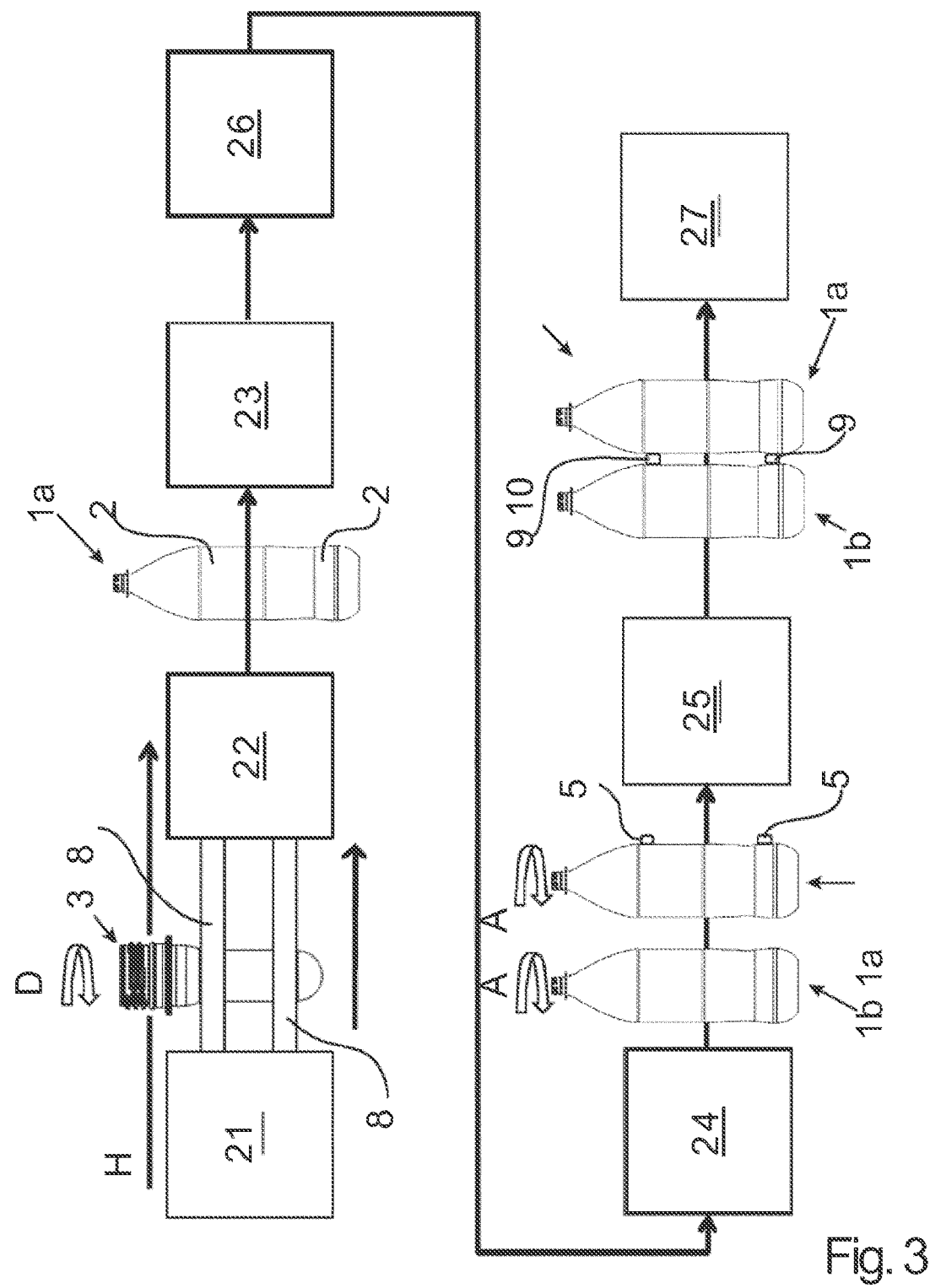
FIG. 3 shows the container from FIG. 1 become part of a multipack with a container that also has a reinforced wall section.

FIG. 3 shows an alternative in which two cooling zones 8 define two cooled regions 4 that are separate from each other. These ultimately become two reinforced wall portions 2 on a container wall 16. The embodiment shown in FIG. 3 is otherwise similar to that shown in FIG. 2.

FIG. 3 also shows an inspection device 26 following the treatment unit 23 and upstream of the adhesive applicator 24. The inspection device 26 screens out any containers 1a, 1b that may have defects or that are incorrectly filled. The containers 1a, 1b that pass the screening test then enter a combiner 25 to be formed into multipacks 10 that are then provide to a palleting device 27 for automatic palleting.

Having described the invention, and a preferred embodiment thereof, what is claimed as new and secured by letters patent is:

The invention claimed is:

1. A method for producing a multipack with first and second containers, wherein at least one container comprises a reinforced wall portion, said method comprising
providing a preform for said first container,
heating said preform and cooling at least a portion of said preform, said portion being a cooled portion,
producing said first container from said preform, wherein said first container comprises a reinforced wall portion formed from said cooled portion of said preform,
applying an adhesive to produce an adhesive point in said reinforced wall portion of said first container, and
forming a multipack by fixing said second container to said adhesive point on said first container.

2. The method of claim 1, wherein cooling comprises exposing said cooled portion to a flow of cooling gas.

3. The method of claim 1, further comprising rotating said preform is rotated while cooling said cooled portion such that said cooled portion is ring shaped.

4. The method of claim 1, further comprising regulating cooling gas flow to control a thickness of said reinforced wall portion.

5. The method of claim 1, further comprising regulating cooling gas pressure so as to cause said reinforced wall portion to have a material thickness that is greater than thirty percent of a thickness of a container wall at a portion other than said reinforced wall portion.

6. The method of claim 1, wherein providing said preform comprises providing a preform having a constant thickness in said region.

7. The method of claim 1, wherein providing said preform comprises providing a preform that has been formed as one piece.

8. The method of claim 1, wherein producing said first container from said preform comprises stretch blow molding said preform.

9. The method of claim 1, wherein said second container comprises a reinforced wall portion that, when said multipack is formed, is adhesively bonded to said first container.

10. The method of claim 1, further comprising rotating said preform while said preform is being conveyed along said nozzle arrangement.

11. The method of claim 10, further comprising rotating said preform while said preform is being conveyed along a slot nozzle.

12. The method of claim 1, wherein cooling comprises causing said cooled region to be reduced by at least two degrees centigrade relative to a remainder of said preform.

13. The method of claim 12, wherein cooling comprises causing said cooled region to be reduced by at least five degrees centigrade relative to a remainder of said preform.

14. An apparatus for producing a multipack with at least two containers, said apparatus comprising a heater for heating preforms, a stretch blow molding device for producing containers from said heated preforms, a device for applying an adhesive for producing an adhesive point on said containers, and a combiner for combining said containers by said adhesive point to form a multipack, wherein said apparatus further comprises a gas nozzle arrangement configured to form a cooling zone on a portion of said heated preform.

15. The apparatus of claim 14, wherein said preform has a circumference, wherein said nozzle arrangement comprises a slot arranged at right angles to a movement direction of said preforms, wherein said slot has a length in said movement direction equal to said circumference.

16. The apparatus of claim 14, wherein said nozzle arrangement comprises a linear arrangement of a plurality of gas nozzles, wherein said gas nozzles are arranged at right angles to a direction of movement of said preforms through said apparatus, wherein said gas nozzles are formed as boreholes with a diameter of between half a millimeter and four millimeters.

17. A manufacture comprising a multipack comprising first and second containers, each having a container wall, wherein said first and second containers adhere together as a result of an adhesive at an adhesive point, wherein said first container was formed from a preform that, after having been heated, was cooled at a region of a wall thereof, said region defining a cooled region, wherein said cooled region comprises a reinforced wall portion to which adhesive was applied to form said adhesive point to which said second container was fixed.

* * * * *